United States Patent [19]

Miller et al.

[11] 4,398,294
[45] Aug. 9, 1983

[54] HIGH POWER NUCLEAR PHOTON PUMPED LASER

[75] Inventors: Thomas G. Miller; John E. Hagefstration, both of Huntsville, Ala.; Dennis R. Womack, Knoxville, Tenn.; Bonnie G. McDaniel, Huntsville, Ala.

[73] Assignee: The United States of America as represented by the Secretary of the Army, Washington, D.C.

[21] Appl. No.: 213,527

[22] Filed: Dec. 5, 1980

[51] Int. Cl.³ .............................................. H01S 3/091
[52] U.S. Cl. ......................................... 372/70; 372/73
[58] Field of Search ...................... 372/69, 70, 73, 74

[56] References Cited

PUBLICATIONS

J. Gray Eden, Optics Letters, vol. 3, No. 3, Sep. 1978; pp. 94–96.
R. J. DeYoung et al.; Applied Physics Letters, vol. 30, No. 1, Jan. 1, 1977; pp. 19–21.
D. A. McArthur et al.; Applied Physics Letters, vol. 26, No. 4, Feb. 15, 1975; pp. 187–190.

Primary Examiner—William L. Sikes
Assistant Examiner—Léon Scott, Jr.
Attorney, Agent, or Firm—Robert P. Gibson; Anthony T. Lane; James T. Deaton

[57] ABSTRACT

A device for producing high power coherent radiation by using nuclear energy as the energy source to cause photons to be produced from a photon producing gas and in turn utilizing the photons to pump a laser gas to create a population inversion necessary for lasing.

7 Claims, 2 Drawing Figures

HIGH POWER NUCLEAR PHOTON PUMPED LASER

DEDICATORY CLAUSE

The invention described herein may be manufactured, used, and licensed by or for the Government for governmental purposes without the payment to us of any royalties thereon.

BACKGROUND OF THE INVENTION

Experiments to demonstrate that nuclear energy could be used directly to pump a laser were performed as indicated in the article reported by D. A. McArthur and P. B. Tollefsrud, Appl Phy Lett, Volume 26, No. 4, Feb. 15, 1975, page 187. Since that time several nuclear pumped lasers have been demonstrated as evidenced in the article by R. J. DeYoung, N. W. Jalufka and F. Hohl, Appl Phys. Lett, Volume 30, No. 1, Jan. 1, 1977, page 19. The idea which is basic to nuclear pumped lasers is the absorption of a neutron by a fissionable nucleus with subsequent fissioning. A typical process is

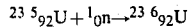
$$^{235}_{92}U + ^1_0n \rightarrow ^{236}_{92}U$$

The $^{236}_{92}U$ atom is unstable and splits releasing energy. A typical equation is

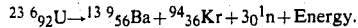
$$^{236}_{92}U \rightarrow ^{139}_{56}Ba + ^{94}_{36}Kr + 3^1_0n + Energy.$$

On the average about 180 MeV of energy is released per fission with about 170 MeV appearing in the form of kinetic energy of the fission fragments. The balance of the energy appears as gamma ray energy and kinetic energy of the neutrons that are emitted. A second nuclear reaction that is important is the fissioning of $^3_2He + ^1_0n \rightarrow ^1_1H + ^3_1H + Energy$. The central problem of nuclear pumped lasers has been to successfully convert the nuclear energy into laser photon energy.

Therefore, it is a principle object of this invention to provide a nuclear pumped laser which utilizes nuclear energy to act on a medium to produce laser photon energy that is in turn utilized to pump a laser gas medium to produce a laser output.

Another object of this invention is to use a nuclear energy source which is a compacted energy source.

Still another object of this invention is to provide an efficient system which converts nuclear energy to laser energy directly and thereby by-passing the conventional cycle of heat→mechanical energy→electrical energy→laser energy.

Yet another object of this invention is to provide a system which overcomes problems that are encountered in similar systems when using thin foils such as in e-beam systems.

Still another object of this invention is to provide a laser which has the capability of producing wavelengths in the ultraviolet and visible wavelengths that are difficult to achieve using conventional pumping techniques.

Still a further object of this invention is to provide a laser system which can be used to produce excimer lasers.

A still further object of this invention is to provide a laser system which produces a better beam quality of excimer lasers as the density of the pump medium is much less than conventional e-beam excimer lasers.

Still another object of this invention is to provide photon pumping of the laser medium which deposites less heat in the laser gases to thereby reduce gas flow requirements.

Further objects and and advantages of this invention will be obvious to those skilled in this art.

SUMMARY OF THE INVENTION

In accordance with this invention, a nuclear source is placed in the center of a cylinder which is made of a material with a large neutron inelastic scattering cross section to convert neutron energy produced by the source to gamma and X-ray energy. Surrounding this scattering material is a cylinder of a moderator which further slows down the neutrons. The moderator cylinder is then surrounded by a further larger cylinder which is filled with a mixture of a photon producing gas. The larger cylinder has several tubes placed therein and sealed relative to the moderator cylinder and the larger cylinder by disk portions at opposite ends. The several tubes contain lasing gas and cavity mirrors for allowing any laser output to be exited therefrom. In this system, neutrons are produced from the source to produce energy which causes photons to be produced from the photon producing gas and these photons pass through the walls of the laser tubes to produce the necessary states required for a population inversion and hence lasing results from the lasing gas within the laser tubes and is output at one end through the cavity mirror of each laser tube.

DESCRIPTION OF THE PREFERRED EMBODIMENT

Figure 1:
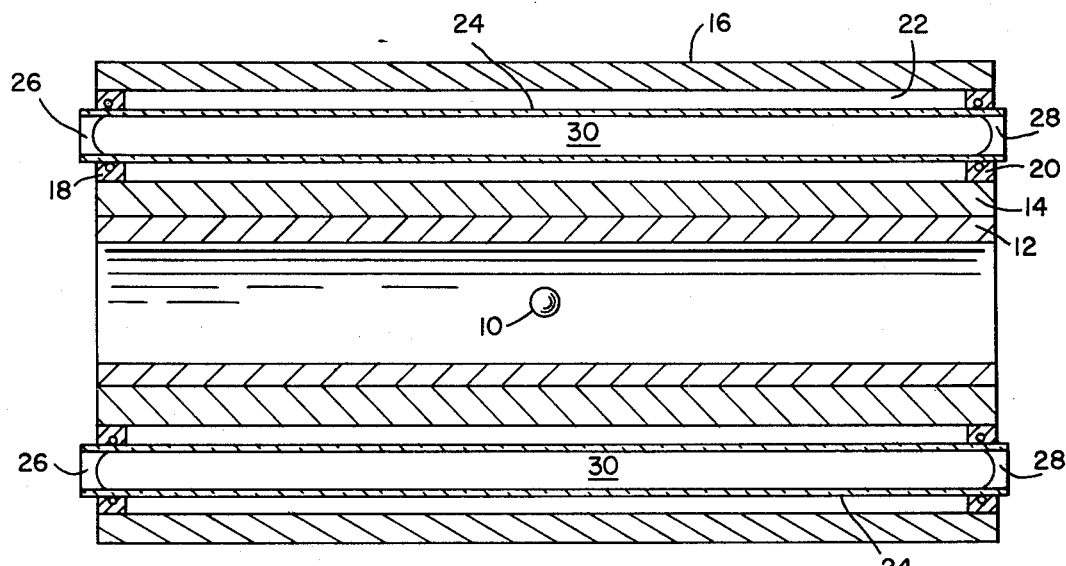
FIG. 1 is a schematic illustration in section of a high power nuclear photon pumped laser in accordance with this invention.
Figure 2:
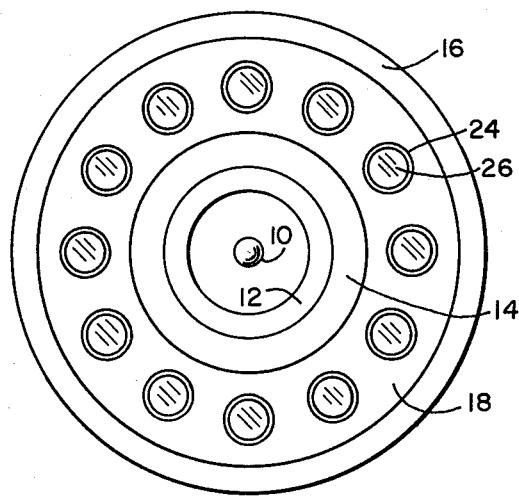
FIG. 2 is an end view of the high power nuclear photon pumped laser.

Referring now to the drawing, a neutron source within a power range from about $10^{15}$ to about $10^{24}$ neutrons in 100 nsec to about 100 $\mu$sec pulse is placed in the center of a first cylinder 12 which is made of a material that has a large neutron inelastic scattering cross section such as iron. Available neutron sources that can be used are the dense plasma focus with a power of $10^{17}$ neutrons, a fast burst reactor with an output of $10^{15}$ neturons or a small burst device with a power output of $10^{24}$ neutrons. Inner cylinder 12 is made of a material such as iron to serve as a containment device and to convert neutron energy from source 10 to gamma and X-ray energy. Surrounding inner cylinder 12 is a second cylinder 14 of moderator material such as graphite, beryllium or paraffin. The purpose of moderator cylinder 14 is to further slow down the neutrons that have been inelastic scattered by the material of inner cylinder 12. Second moderating cylinder 14 is surrounded by an outermost cylinder 16 and end disks 18 and 20 are secured between cylinders 14 and 16 and sealed relative thereto in a conventional manner to define chamber 22 between cylinders 14 and 16. Chamber 22 is filled with a photon producing fluid such as Xe or a mixture of high pressure Xe and Helium-3. Helium-3 can be present in a weight percentage of about 0–33%. Disks 18 and 20 serve to mount and seal a multiplicity of laser tubes 24, 12 of which are shown. Each of tubes 24 has conventional type cavity mirrors 26 and 28 at opposite ends of tubes 24 with a conventional output from one of mirrors 26 and 28 to allow a laser beam output. Each of tubes 24 is made of a material which is transparent to the particular wavelength of the photons being produced to excite the laser gas contained within chamber 30 of tubes 24. Tubes 24 can be made of a transparent material such as relatively pure quartz or a material of this nature sold under the Trademark of Suprasil or Spectrosil. Outer most cylinder 16 and disks 18 and 20 not only serve as walls for chamber 22, but are made of a reflector material such as graphite or beryllium and this reflector material further serves to moderate the neutrons produced from source 10 and further scatter some of the neutrons back into the photon producing gas or fluid within chamber 22. When source 10 is initiated, energy is emitted and photons are produced in the photon producing gas in chamber 22 in reaction to the energy released and these photons pass through the walls of laser tubes 24 to produce the necessary states of the lasing gas within chamber 30 of tubes 24 to produce the necessary states required for a population inversion and hence lasing at the output of each of the laser tubes 24.

Photons are produced in the photon producing gas in chamber 22 by both the gamma and X-rays that enter the chamber and by the neutrons also. The gamma and X-rays create photons of the correct wavelength by producing ionization directly and thus creating the necessary photon producing states. The neutrons produce photons of the correct wavelength by causing fissioning of certain atoms which are placed in the gas in chamber 22. The charged particles created in the fissioning enduce ionization which in turn creates the necessary photon producing states. Additional photon producing fissioning atoms that can be used in the photon producing gas of chamber 22 include $^3_2He$, $^{10}_5B$, $^6_3Li$ and $^{235}_{92}U$. These fissioning atoms can be provided in chamber 22 in any conventional manner if desired.

A specific example of a high power nuclear photon pumped laser utilizes a photon producing gas that is made of a mixture of high pressure Xe and about 0.01 to about 1.0 percent helium-3. This high pressure is in a range of about 3 to about 15 atmospheres total pressure. Utilizing a neutron source for example of a fast burst reactor of $10^{15}$ neutrons in a 100 nsec to about 100 μsec pulse causes gamma rays, X-rays and high energy charged particles to impinge on the xenon gas in chamber 22 and $Xe_2^*$ states are produced in chamber 22 with resulting radiation of photons being produced of wavelength 1720 Angstroms. The photons of 1720 Angstroms pass through the walls of tubes 24 and impinge on the lasing gas mixture containing argon, $SF_6$ and $XeF_2$ and the following photodissociative reaction occurs

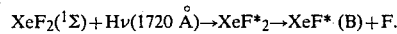

$$XeF_2(^1\Sigma) + H\nu(1720\ \text{Å}) \rightarrow XeF^*_2 \rightarrow XeF^*\ (B) + F.$$

The lasing gas mixture has a major portion of argon of about 2 to about 3 atmospheres and each of the other ingredients, $SF_6$ and $XeF_2$, are present in an amount of about 0.1 to about 1.0% by weight. the XeF* (B) subsequently radiates at 350 angstroms. Therefore, as the number of XeF* (B) states are produced, the gain of the system is made larger than 1 and lasing results. A similar system to applicants' utilizes high energy electrons as disclosed in the publication to J. Gary Eden, Optics Letters, Volume 3, No. 3, September 1978, page 94. This publication discloses more explicitly what is known in the art concerning lasing of an XeF* (B) state and is referred to to show what is known by those skilled in this art concerning laser gases of the type utilized in applicants' invention. It is further pointed out that applicants' invention is a considerable improvement over that disclosed by J. Gary Eden in his publication in that applicants' source is not as limited as that used by Mr. Eden and further the particular inventive arrangement provided by applicants' is not incumbered by such things as thin foils and other fragile type structures. Applicants' system as has been disclosed lends its self to substantial structures that can be used and made of structures that have considerable strength to enable a very rugged high power nuclear photon pumped laser to be produced.

We claim:

1. A high power nuclear photon pumped laser comprising a neutron source capable of producing at least $10^{15}$ neutrons in a 100 nsec to 100 μsec pulse, a material means with a large neutron inelastic scattering cross section mounted adjacent said neutron source for converting neutron energy from said neutron source to gamma and X-ray energy, a moderator material means mounted adjacent said material means with said large neutron inelastic scattering cross section and away from said neutron source for further slowing the neutron energy from said neutron source, a reflector material means mounted relative to said moderator material means in such a manner to define with said moderator material means a chamber, gas tube means for confining an active gaseous medium, said tube means being transparent to photons and mounted in said chamber and having ends that project outside said chamber, means for defining a resonant cavity including cavity mirrors mounted at opposite ends of said tube means, one of said cavity mirrors being partially transparent from passing an output therethrough, said tube means having an active gas mixture therein which includes $XeF_2$, and said chamber having a photon producing fluid therein that includes Xe, whereby when neutron energy is produced by said neutron source, energy therefrom acts on the photon producing fluid to produce photons which in turn act as a pumping means for said lasing gas mixture to cause a population inversion necessary for lasing.

2. A high power nuclear photon pumped laser as defined in claim 1, wherein said material means with a large neutron inelastic scattering cross section is made of iron.

3. A high power nuclear photon pumped laser as defined in claim 2, wherein said moderator material means is selected from the group consisting of graphite, beryllium, and paraffin.

4. A high power nuclear photon pumped laser as defined in claim 3, wherein said reflector material means is selected from the group consisting of graphite and beryllium.

5. A high power nuclear photon pumped laser as defined in claim 4, wherein said material means with a large neutron inelastic scattering cross section is in the shape of a cylinder, said moderator material means is in the shape of a cylinder that is telescoped over said material means which has a large neutron inelastic scattering cross section, and said reflector material means includes two end disks and an outer cylinder member.

6. A high power nuclear photon pumped as set forth in claim 5, wherein said tube means includes a multiplicity of tubes.

7. A high power nuclear photon pumped laser as defined in claim 6, wherein said multiplicity of tubes are arranged in a circular pattern and are equally spaced from each other.

* * * * *